United States Patent [19]

Hayet

[11] Patent Number: 5,559,833
[45] Date of Patent: Sep. 24, 1996

[54] TRANSMISSION SYSTEM COMPRISING TIMING RECOVERY

[75] Inventor: Pascal Hayet, Brunoy, France

[73] Assignee: U.S. Philips Corporation, New York, N.Y.

[21] Appl. No.: 184,626

[22] Filed: Jan. 19, 1994

[30] Foreign Application Priority Data

Jan. 20, 1993 [FR] France ................................. 93 00539

[51] Int. Cl.⁶ ........................ H04L 27/00; H04L 27/06; H04L 25/38
[52] U.S. Cl. ........................ 375/259; 375/316; 375/369
[58] Field of Search ........................ 375/354, 362, 375/208–210, 369, 370, 371, 365, 366, 367, 368, 316, 259; 370/100.1, 105.1, 105.4, 107, 108; 327/141, 144–147

[56] References Cited

U.S. PATENT DOCUMENTS 3,599,103 8/1971 Nussbaumer ........................ 328/135
3,883,729 5/1975 De Cremiers ........................ 235/181
5,230,013 7/1993 Hanke et al. ........................ 375/376

OTHER PUBLICATIONS

"Applications of the digital correlator" J. Eldon, Microprocessors and Microsystems, vol. 12, No. 4, May 1988, pp. 214–224.

Primary Examiner—Stephen Chin
Assistant Examiner—Hai H. Phan
Attorney, Agent, or Firm—Michael J. Balconi-Lamica; Michael E. Marion

[57] ABSTRACT

The invention relates to a device for recovering a symbol timing for the decoding of received signals formed by code-modulation symbols transmitted in an orthogonal frequency-division multiplexing mode (OFDM). The signals are formatted in symbol blocks of which each block presents redundant information. The invention comprises means for delaying the symbol blocks and for subtracting from a symbol block the delayed symbol block corresponding thereto. In this manner a difference signal e(t) is obtained which is used for controlling a loop formed by a local oscillator operating at the clock frequency, a frequency divider and a phase comparator.

10 Claims, 1 Drawing Sheet

TRANSMISSION SYSTEM COMPRISING TIMING RECOVERY

BACKGROUND OF THE INVENTION

1. Field of the Invention

The invention relates to a transmission system comprising a transmitter for transmitting a transmit signal formatted in blocks coming from symbols of a constellation, the same block containing the same information signal present a first and a second time, and a receiver for receiving said signal.

The invention likewise relates to a receiver used in such a transmission system.

2. Discussion of the Related Art

In a general manner the invention relates to signals formatted in blocks for which said blocks may have a great complexity due to redundant information. They may be, for example, signals obtained from orthogonal N-frequency division multiplexing which consists of splitting up a transmit information signal by distributing same over a large number of low-rate elementary channels. One thus transforms a highly selective wideband channel into a large number of non-selective elementary channels. As the arrangement forms a wideband channel, it is not very likely that fading during transmission will simultaneously affect the whole channel. This technique specifically makes it possible to reduce intersymbol interference.

One frequency thus corresponds to each elementary channel, all the frequencies together being a symmetrically distributed around a central carrier frequency. As it is hard to accept the use of selective filters at the receiver end, one prefers tolerating an overlap of the spectra but then requirements are imposed with respect to orthogonality between the frequencies to eliminate intersymbol interference at the sampling instants. The whole spectrum of an OFDM signal thus tends towards a rectangular spectrum.

At the receiver end the received signals are to be demodulated and then decoded to restore the original information. For this demodulation is used a local oscillator whose frequency is to be locked on to the transmit frequency.

The OFDM signal is subdivided into frames formed by blocks of which certain blocks are service blocks and other blocks are data blocks. To avoid intersymbol interference, each block contains redundant information signals. Any block is formed at all the OFDM frequencies the device uses, the frequencies being modulated by transmit symbols coming from a coded modulation, for example, a digital PSK or QAM modulation. At the transmitter end, the symbols are coded with a certain timing which is to be found back at the receiver end, so that they can be decoded correctly. The invention proposes to find back at the receiver end the timing used at the transmitter end.

FR 2 639 495 is known which describes a digital data transmission method which employs an OFDM technique. The method of synchronization recovery is carried out with a frame while use is made of two specific blocks which are a zero block at the beginning of the frame and a wobulation block. This document puts forward the importance it presents of not synchronizing a timing clock with the binary level as in previous techniques. Said document thus works with binary data acquisition windows which it considers to have a sufficiently high precision for decoding the binary data.

But when a synchronization is effected once per frame, a frame having, for example, a duration of 20 ms, the precision of the synchronization remains insufficient.

Thus, it is an object of the invention to provide a clock synchronization with a better precision than in the prior art for a signal formatted in blocks which themselves contain redundant information signals.

SUMMARY OF THE INVENTION

This object is achieved by effecting a timing recovery while use is made of data received with the block frequency. Therefore, the transmission system is characterized in that the receiver comprises:

first generator means for generating a local symbol clock, said clock having a first frequency, second generator means for generating a difference signal that corresponds to a second frequency, the difference signal being obtained via correlation between the information signal present the first time and that present the second time in the same block, third means for locking the first frequency on the second frequency.

Thus the invention advantageously utilizes the redundancy of the data contained in each block to considerably improve the quality of the synchronization.

In the particular case of an OFDM signal, with a frame containing 125 blocks, the precision of the timing recovery can be estimated to be improved by a factor of about 125.

Preferably, the second generator means bring about the correlation by performing a subtraction between the information signal present the first time and the information signal present the second time.

For subtracting from each other the groups of data present at the beginning and end of each block, time delay means are used which form a delayed replica of the received signal, which replica is subtracted from the received signal itself, so that a control signal is supplied which is in accordance with the block rate.

This control signal influences a phase locked loop to control, by a frequency division, an oscillator whose oscillation frequency is much higher than the block frequency and which produces the baud rate clock.

These various aspects of the invention and also other will be apparent and elucidated on the basis of the embodiments to be described hereinafter.

The invention will be better understood with reference to the following Figures given by way of non-limiting examples which represent in:

DETAILED DESCRIPTION OF THE PREFERRED EMBODIMENTS

Figure 1:
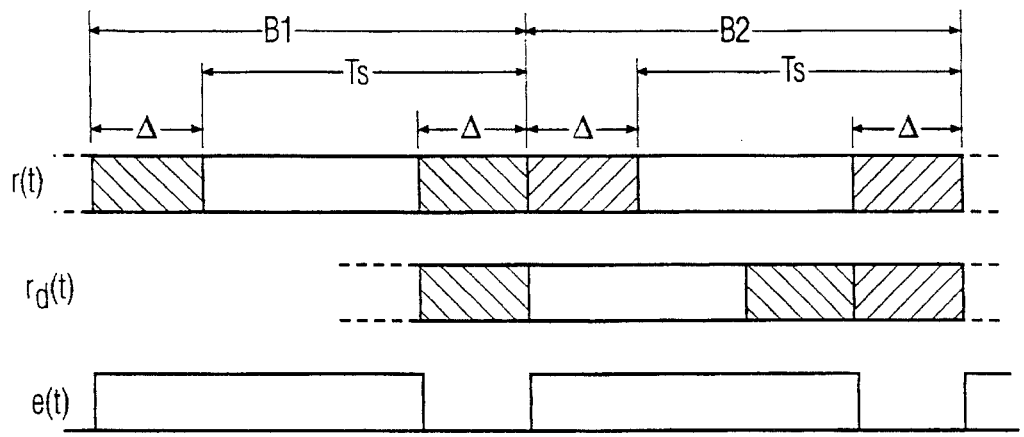
FIG. 1: a time diagram indicating the generation of a difference signal at the block rate.

The following description has been developed in the particular case of an OFDM signal, but also applies to other signals formatted in blocks for which each block contains redundant information signals.

The OFDM technique consists of frequency multiplexing various orthogonal carriers modulated by the symbols. An OFDM symbol may be written as:

$$S(t) = R_e \left\{ e^{2j\pi f_0 t} \sum_{k=0}^{N-1} x_k \cdot \phi_k(t) \right\} \quad (1)$$

for $$j.T'_s < t < (j+1)T'_s$$

with $$\Phi_k(t) = e^{2j\pi k t/T_s} \text{ for } jT'_s \leq k \leq (j+1)T'_s$$

where:

T's: total duration of an OFDM symbol, $T'_s = T_s + \Delta$ $R_e$: real part of a complex number k: index of the orthogonal carriers $R_s$: useful period of an OFDM symbol $\Delta$: check interval N: maximum number of carriers $f_0$: random frequency j: index of the OFDM symbol.

Thus between the instants $j.T'_s$ and $(k+1)T'_s$, an OFDM signal is formed by a block of complex symbols $x_k$, where each symbol $x_k$ modulates an orthogonal carrier $0 \leq k \leq N-1$.

To avoid the problem of spectrum overlap and to facilitate the filtering at the receiver end, the sum corresponding to the equation (1) is made of $N_u$ carriers where $N_u$ is the number of useful carriers ($N_u < N$).

To realise the OFDM modulation, that is to say, form the signal s(t) of equation (1), a modulator is used which performs a calculation of an inverse Fast Fourier transform (FFT$^{-1}$). Therefore, a number of the form $2^x$, where x is an integer is selected for N. Other check blocks intended for the transmission are also inserted.

The selected parameters are, for example, the following:

$T'_s = 160 \text{ μs}, T_s = 128 \text{ μs and } \Delta = 32 \text{ μs},$ $N = 1024$ carriers, $N_u = 900$ carriers.

The main role of the check interval $\Delta$ is to absorb the echoes coming from the multipath channel and having delays which are lower than $\Delta$. During the check interval (which is preferably equal to a quarter of the useful period) there is transmitted a signal that is identical with part of the useful period.

The selection of $N_u = 900$ comes from the fact that with the band around each carrier being $1/T_s = 7.81$ kHz, 900 carriers are necessary to have an effective bandwidth of the transmitted signal of about 7 MHz (the exact bandwidth being 7.031 MHz.

The blocks at the output of a channel coder are transmitted in frames. Thus a frame regroups a plurality of time-division multiplexed OFDM blocks. An OFDM block may contain data or may be a block particularly used for the synchronization (frame, clock, carrier synchronization) or used as a reference block for the difference modulation.

An example of the frame structure is given by:

TABLE 1

| 1 | 2 | 3 | 4 | 5 | 6 | 7 | | j-1 | j | | 125 |
|---|---|---|---|---|---|---|---|---|---|---|---|
| Nul | AFC | Wob | Ext 1 | Ext 2 | Data 1 | Data 2 | | | | | |

$T_S = 160$ μs

⟵ ⟶

⟵ $T_f = 20$ MS ⟶

The frame contains 125 OFDM blocks and has a duration $T_f$ of 20 ms;

The first block is the zero block during which nothing is transmitted ($x_k = 0$, k=0, N-1). It is used for synchronizing the beginning of the frame.

The second block is the AFC (automatic frequency control) block used for synchronizing the frequency of the local oscillator of the receiver with that of the transmitter.

The third block is the wobulation block defined by:

$$x_k = \sqrt{2} \; e^{j\phi_k}, \phi_k = \pi \frac{k^2}{N} + \frac{\pi}{4}$$

The wobulation block is used as a reference block for the differential coding and also for estimating the impulse response of the channel for a precise synchronization of the beginning of the frame.

The fourth and fifth blocks are additional blocks which may be used for transmitting service data.

Finally, there are the 120 OFDM data blocks.

A frame contains 100 codewords generated by the channel coder.

The invention advantageously uses the existence of a check interval in each block of an OFDM frame. FIG. 1 represents two consecutive blocks B1 and B2. The following explication applies to all the blocks. The blocks B1/B2 are formed by a check interval having duration $\Delta$ followed by a useful interval having duration $T_2$ which contains useful data. In a transmitted block the data which appear at the end of the useful interval $T_s$ are copied at the beginning of the block before being transmitted through the channel. It will thus be noted that in each block an identical information signal appears at the beginning and at the end of the block. In FIG. 1 the received signal is the signal r(t). This signal r(t) is delayed by a delay means of one delay with the information at the beginning of the delayed signal $r_d(t)$ being in phase with the information at the end of the undelayed signal r(t). For the same block B1 these two information signals are identical. By subtracting these two signals, a signal e(t) is obtained which is formed by an interval having duration $\Delta$ where e(t) is zero preceded by an interval having duration $T_s$ where it is non-zero. In FIG. 1 the signal e(t) is represented in the form of a square-wave signal, but in reality this signal presents a more complex and more sinusoidal shape, having a fundamental frequency equal to the block frequency. It is thus possible to isolate this block frequency by filtering.

Figure 2:
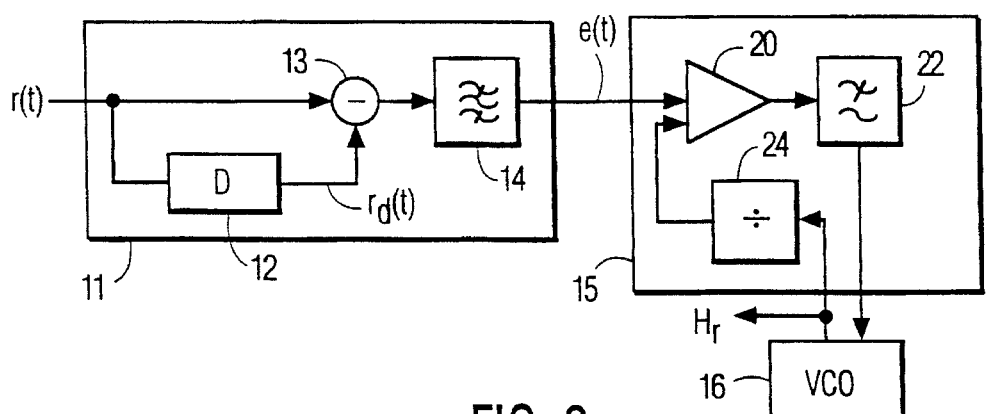
FIG. 2: a diagram of a timing recovery device according to the invention arranged in the receiver.

FIG. 2 represents a diagram of a device according to the invention which permits isolating the block frequency and controlling an oscillator that oscillates initial symbols of the coded modulation with the clock frequency. Means 11 make it possible to generate the difference signal e(t) with the block frequency. The means 11 comprise associated filter means 14. The signal r(t) is delayed in delay means 12 for the signal $r_d(t)$ to be produced. The signals r(t) and $r_d(t)$ are subtracted from each other in subtracter means 13 and produce the difference signal e(t). This difference signal e(t) has previously been filtered in a passband filter 14 brought in line with the block frequency used at a transmitter end.

The difference signal enters a phase-locked loop 15. It is intended to control a local oscillator 16 of the VCO type which oscillates, in the free running mode, with a frequency close to the clock frequency of the coded modulation symbols. The loop 15 is formed by a comparator 20, a low-pass filter 22 and a frequency divider 24. By way of example, the frequency of the signal e(t) can be equal to 12.5 kHz and the frequency of the oscillator close to 16 MHz. The output signal of the filter 22 (12.5 kHz) controls the frequency of the oscillator 16. To reduce the frequency of the oscillator signal to a 12.5 kHz frequency, so that the loop 15 can operate, it is necessary to insert a frequency divider 24. In said example there has to be divided by a factor of 1280. When the alignment has been effected, the output of the oscillator supplies the baud rate clock Hr.

What is claimed is:

1. A transmission system comprising:
    a transmitter for transmitting a digital transmit signal subdivided into frames and formatted in blocks having a prescribed block frequency, the blocks further originating from symbols of a constellation, wherein the symbols are coded with a certain timing in accordance with a coded modulation, each of the blocks including a first and a second occurrence of an identical information signal at a beginning and an end of each block, respectively; and
    receiver for receiving the transmit signal, wherein said receiver comprises
    a first generator means for generating a local symbol clock signal, said local symbol clock signal having a first frequency, the first frequency being higher than the block frequency;
    a second generator means for generating a difference signal having a second frequency, the second frequency being equal to the block frequency, the difference signal further being generated by a correlation between the first occurrence of the information signal and the second occurrence of the information signal for each block; and
    a feedback circuit means coupled to said first generator means and said second generator means for locking the first frequency on to the second frequency, wherein said first generator means further generates the local symbol clock signal at a recovered timing corresponding to the timing of coded modulation symbols contained in the blocks of the transmit signal.

2. The transmission system as claimed in claim 1, wherein said second generator includes a delay circuit means for delaying the received transmit signal by a period of time equal to a duration of time between the first occurrence of the information signal and the second occurrence of the information signal.

3. The transmission system as claimed in claim 2, wherein said second generator means subtracts the first occurrence of the information signal from the second occurrence of the information signal.

4. The transmission system as claimed in claim 1, wherein said second generator means subtracts the first occurrence of the information signal from the second occurrence of the information signal.

5. The transmission system as claimed in claim 1, wherein said feedback circuit means further comprises a frequency-division phased lock loop circuit and wherein said first generator means further comprises a high-frequency oscillator.

6. A receiver for receiving a digital transmit signal subdivided into frames and formatted in blocks having a block frequency, the blocks being formed by symbols of a constellation, wherein the symbols are coded with a certain timing in accordance with a coded modulation, each block including a first and a second occurrence of an identical information signal at a beginning and an end of each block, respectively, said receiver comprising:
    a first generator means for generating a local symbol clock signal, said local symbol clock signal having a first frequency, the first frequency being higher than the block frequency;
    a second generator means for generating a difference signal having a second frequency, the second frequency being equal to the block frequency, the difference signal further being generated by a correlation between the first occurrence of the information signal and the second occurrence of the information signal for each block; and
    a feedback circuit means coupled to said first generator means and said second generator means for locking the first frequency on to the second frequency, wherein said first generator means further generates the local symbol clock signal at a recovered timing corresponding to the timing of coded modulation symbols contained in the transmit signal.

7. The receiver as claimed in claim 6, wherein said second generator means includes a delay circuit means for delaying the received transmit signal by a period of time equal to a duration of time between the first occurrence of the information signal and the second occurrence of the information signal.

8. The receiver as claimed in claim 7, wherein said second generator means subtracts the first occurrence of the information signal from the second occurrence of the information signal.

9. The receiver as claimed in claim 6, wherein said second generator means subtracts the first occurrence of the information signal from the second occurrence of the information signal.

10. The receiver as claimed in claim 6, wherein said feedback circuit means further comprises a frequency-division phased lock loop circuit and wherein said first generator means further comprises a high-frequency oscillator.

* * * * *